United States Patent
Sextro (10) Patent No.: US 6,309,095 B1
(45) Date of Patent: Oct. 30, 2001

(54) DEVICE FOR REGULATING A COMPOSITION OF FEED MATERIAL FED FROM MULTIPLE FEED SOURCES

(75) Inventor: Franz-Josef kl. Sextro, Vechta (DE)

(73) Assignee: WEDA-Dammann & Westerkamp GmbH, Lutten (DE)

( * ) Notice: Subject to any disclaimer, the term of this patent is extended or adjusted under 35 U.S.C. 154(b) by 0 days.

(21) Appl. No.: 09/340,920

(22) Filed: Jun. 28, 1999

(30) Foreign Application Priority Data

Jun. 26, 1998 (DE) .......................................... 298 11 455 U (51) Int. Cl.⁷ .................................................. B01F 15/02
(52) U.S. Cl. ............................................ 366/134; 366/192
(58) Field of Search ...................................... 366/131, 134, 366/141, 152.1, 160.1, 160.2, 162.1, 184, 192, 193; 364/528.4

(56) References Cited

U.S. PATENT DOCUMENTS

Re. 34,776 * 11/1994 Pratt ...................................... 366/141
3,608,869 * 9/1971 Woodle .
4,357,110 * 11/1982 Hope et al. .
4,964,732 * 10/1990 Cadeo et al. .
5,340,210 * 8/1994 Patel et al. ............................ 366/141

FOREIGN PATENT DOCUMENTS

0491312B1    6/1992 (EP) .

* cited by examiner

Primary Examiner—Charles E. Cooley
(74) Attorney, Agent, or Firm—Jordan and Hamburg LLP (57) ABSTRACT

A feeding device includes two weighing and mixing containers which can be charged from storage containers for the preparation of two cattle feed mixtures of different composition. A flow pipe includes a feed conveying pump and is connected to each bottom outlet of the weighing and mixing containers. A service line which is connected to the flow pipes, has a plurality of valve-controlled branches to consumer sites and guides dividing bodies with a central control computer. The service line is connected only at its ends with one of the flow pipes and is provided with only a single dividing body for separating the feed.

23 Claims, 6 Drawing Sheets

DEVICE FOR REGULATING A COMPOSITION OF FEED MATERIAL FED FROM MULTIPLE FEED SOURCES

BACKGROUND OF THE INVENTION

In the case of a known feeding device of this type (EP 0 491 312 B1), there are three dividing bodies, which are guided in the service line, and the flow pipes can be connected with the ends of the service line and additionally with the service line at feeding sites disposed in each case at a distance from the ends. This opens up a large number of possible movements for the dividing bodies along the service line.

SUMMARY OF THE INVENTION

The inventive feeding device, constructed with only a single dividing body, enables cattle feed of the one or the other composition to be extracted at each of the branches with only a single dividing body. Furthermore, using only a single dividing body, the possibility is also opened up of delivering partial amounts of cattle feed of different composition simultaneously at each branch.

Further details and effects of the invention arise from the following description and the drawings, in which several examples of the object of the invention are shown diagrammatically in greater detail.

DESCRIPTION OF THE PREFERRED EMBODIMENTS

Figure 1:
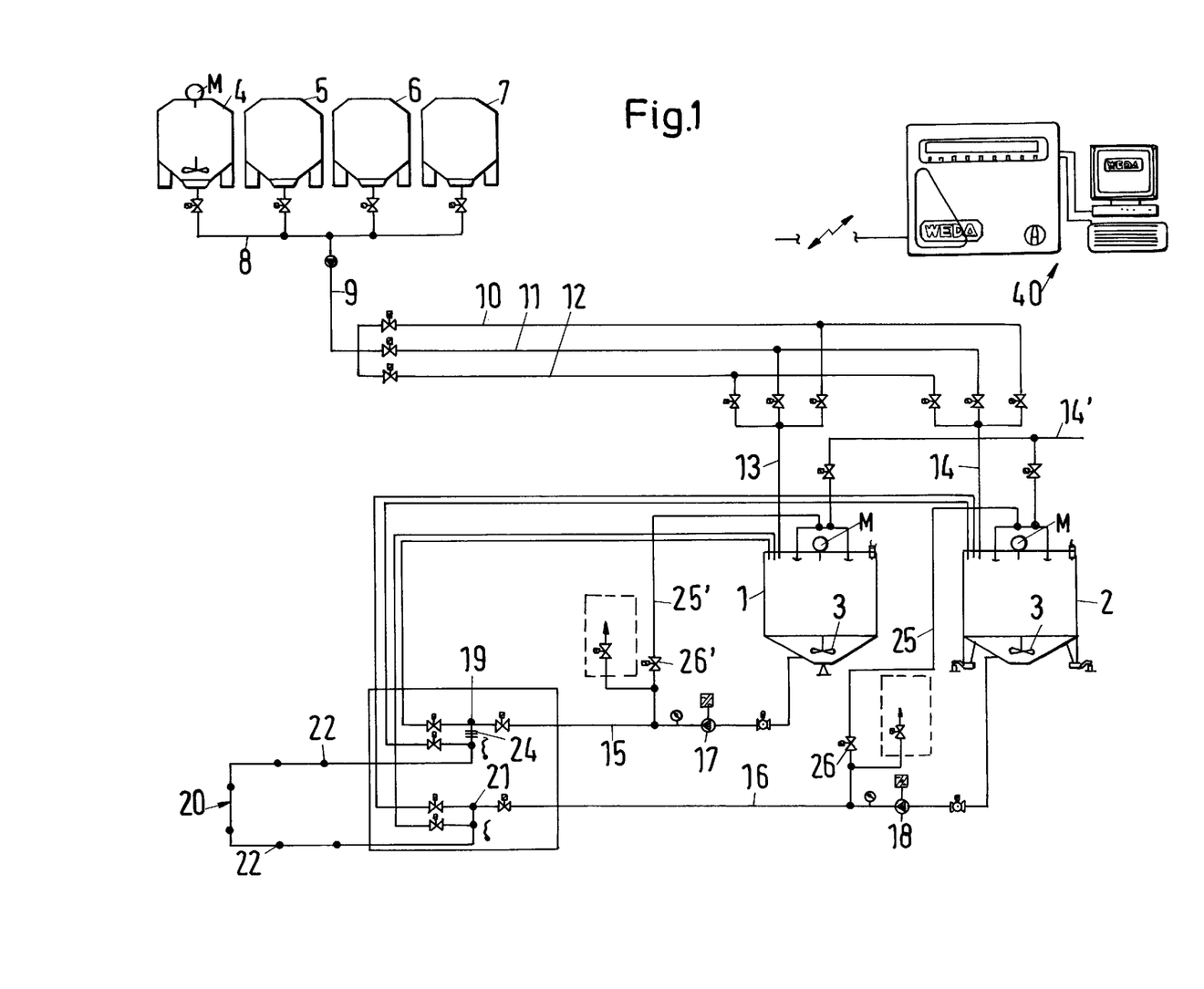
FIG. 1 shows a circuit diagram of an inventive feeding device.

The feeding device, illustrated diagrammatically in FIG. 1, illustrates two weighing and mixing containers 1, 2, each of which is coupled to a weighing mechanism and provided with a motor-driven stirring mechanism 3. The weighing and mixing containers 1, 2 can be charged from a number of storage containers 4, 5, 6, 7 over pipelines 8, 9, 10, 11, 12, 13, 14 with feed components and, over a water supply line 14', with water. The weighing and mixing containers 1, 2 serve to prepare batches of cattle feed mixtures of different compositions.

At the bottom outlet of the weighing and mixing containers 1, 2, in each case flow pipes 15 and 16 respectively are connected, in which there is in each case a feed pump 17 and 18 respectively, which is preferably constructed as a metering pump, such as a spiral pump or a rotary pump. The feed pumps 17, 18 can, for example, be frequency controlled. The flow pipe 15 discharges at the first end point 19 of a service line 20 and the flow pipe 16 discharges at the second end point 21 of the service line 20 into the latter.

Figure 2:
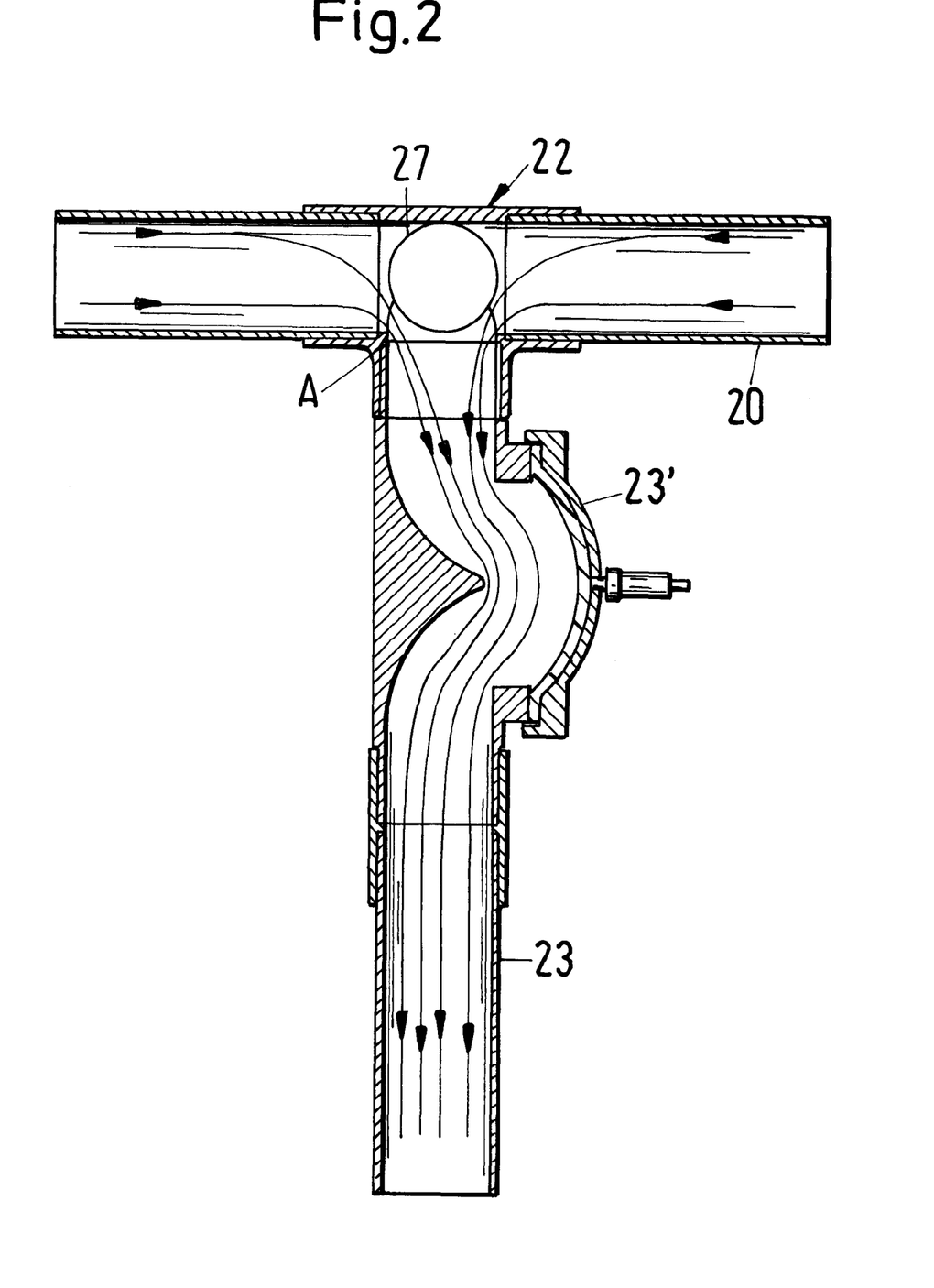
FIG. 2 shows an enlarged, truncated, sectional representation through a branch in the service line for illustrating a spherical dividing body in the delivery position over a branch opening.

Branches 22 to consumers, the number of which depends on the respective requirements and which are illustrated only diagrammatically by a branching point, are provided in service line 20. As shown in FIGS. 1 and 2, outlet pipes 23 to feeding spaces, controlled, for example, by a valve 23, can be connected to the branches 22.

In the service line 20, a dividing body 24 is provided, which is illustrated diagrammatically in FIG. 1, close to the end point 19 of the service line 20.

At the beginning of the feeding process, the flow pipes 15, 16 and the service line 20 are in each case filled with cattle feed. A column of feed extends from the weighing and mixing container 1 over the end point 19 of the service line 20 up to the dividing body 24 and a column of feed of the second feed mixture extends from the weighing and mixing container 2 through the flow pipe 16 and the service line 20 up to the dividing body 24.

In the simplest embodiment of the feeding device with branches 22, to which valve-controlled outlet pipes 23 of the usual type are connected, in each case one of the two cattle feed mixtures, for example, that from the weighing and mixing container 1 over the flow pipe 15 or that from the weighing and mixing container 2 over the flow pipe 16, can be delivered to a branch 22. Hereby the dividing body 24, with the help of the feed columns, in each case is brought into a position in the feed conveying direction behind a branch 22 and fixed there by the feed present in the service line 20 on the averted side of the dividing body 24.

To move the dividing body 24, for example, from a position close to the end point 19 into a position behind any branch 22, a valve 26 is opened in a return pipeline 25 leading to the weighing and mixing container 2 and the feed pump 17 is actuated, until the dividing body 24 has reached the desired position. After that, the valve 26 is closed. As a result, the dividing body 24 is fixed in its position and, after an outlet valve 23' in the outlet line 23 is opened (the various components illustrated, for example, in FIG. 2), remains at a branch 22, adjacent to the dividing body 24 on the side of the feed pump 17, while subsequently the extraction of cattle feed in a specified amount is undertaken. In this way, cattle feed from the weighing and mixing container 1 can be distributed to each of the branches 22. In a similar manner, cattle feed is distributed from the weighing and mixing container 2. This distribution can also take place to each branch 22. The corresponding return pipeline to the weighing and mixing container 1 is labeled 25' and the associated valve is labeled 26'. For such feed delivery processes, a conventional dividing body without a double-sided transmission function is sufficient.

In stead of delivering cattle feed of the one or the other composition to the branch 22, it is also possible to deliver partial amounts of cattle feed of the first and second compositions simultaneously to one and the same branch.

FIG. 2 illustrates an embodiment, for which a dividing body 27 is in a delivery position above the delivery opening A of a branch 22 and opens up a feed passage to the branch opening A from the two adjoining parts of the service line 20, as illustrated by the flow arrows shown. The dividing body 27 of FIG. 2 is constructed as a sphere, which develops its dividing action in the region of its largest diameter, the part, bringing about the separation, having an axial extent, which is less than the length of the branch opening A.

Figure 3:
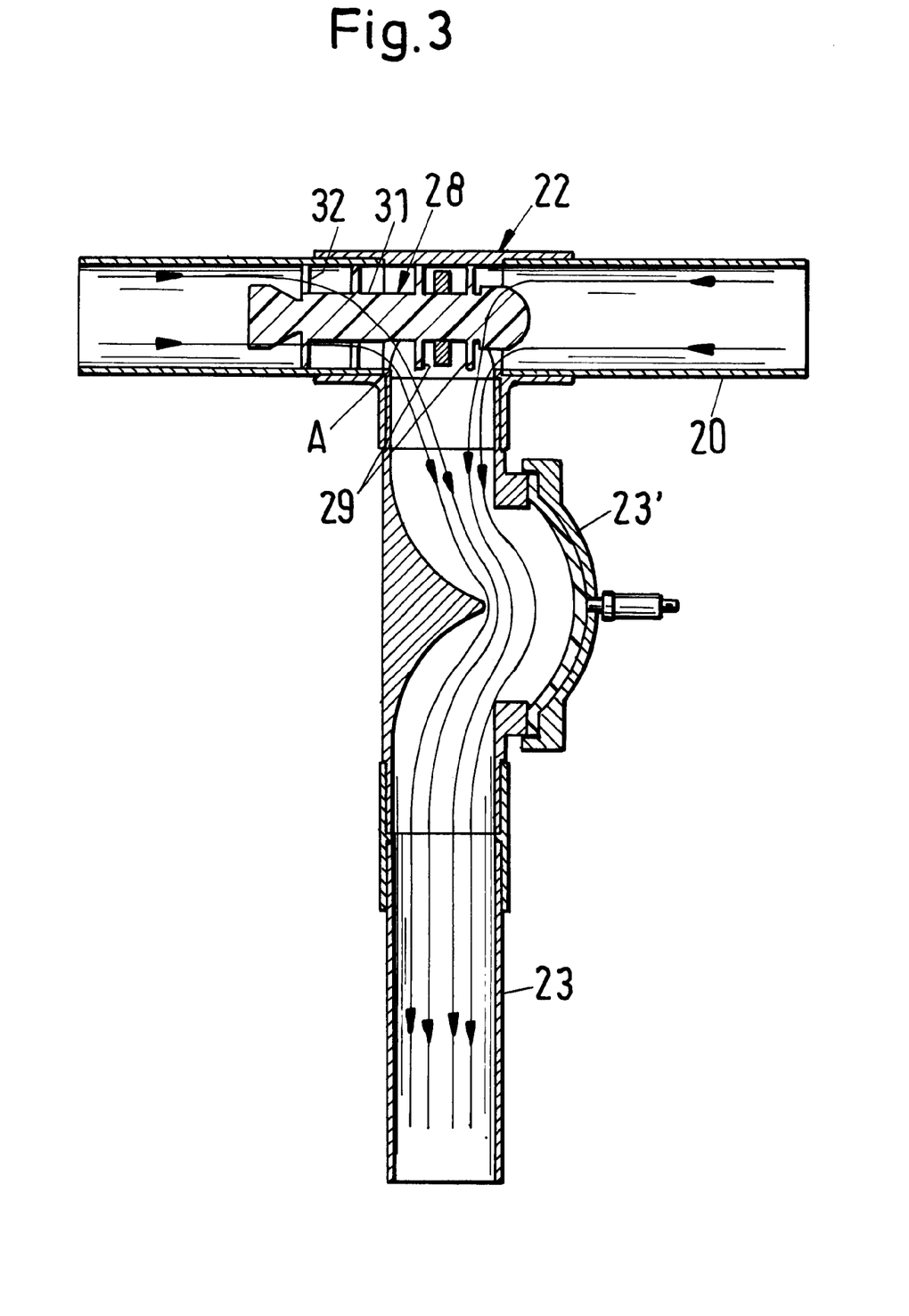
FIG. 3 shows a representation, similar to that of FIG. 2, to illustrate a branch with a dividing body, which basically has a cylindrical construction, is located above a branch opening and opens up a feed passage on either side.

For the embodiment of FIG. 3, a dividing body 28 is provided, which basically has a cylindrical shape and has a part 29, which brings about the separation and the dimensions of which in the axial direction of the dividing body 28 are also smaller than those of the branch opening A. The part 29 of the dividing body 28, which brings about the separation, is formed, for example, by two ring-shaped sealing washers 29, which are disposed next to one another at a distance from one another and placed on a central axial part 31 of the dividing body 28. This axial part 31 can be supported and guided additionally in the service line 20, for example, by a spoke-shaped guide piece 32. Such a dividing body 28 also offers the possibility of simultaneously delivering partial amounts of cattle feed of both compositions, which flow through the recesses in the dividing body 28 on either side of the part 29, bringing about the separation.

Due to the pressure in the two feed columns on either side, the dividing bodies, 27, 28 are held in dynamic oscillation in their delivery position, the proportions being determined by the feed pumps 17, 18.

Figure 4:
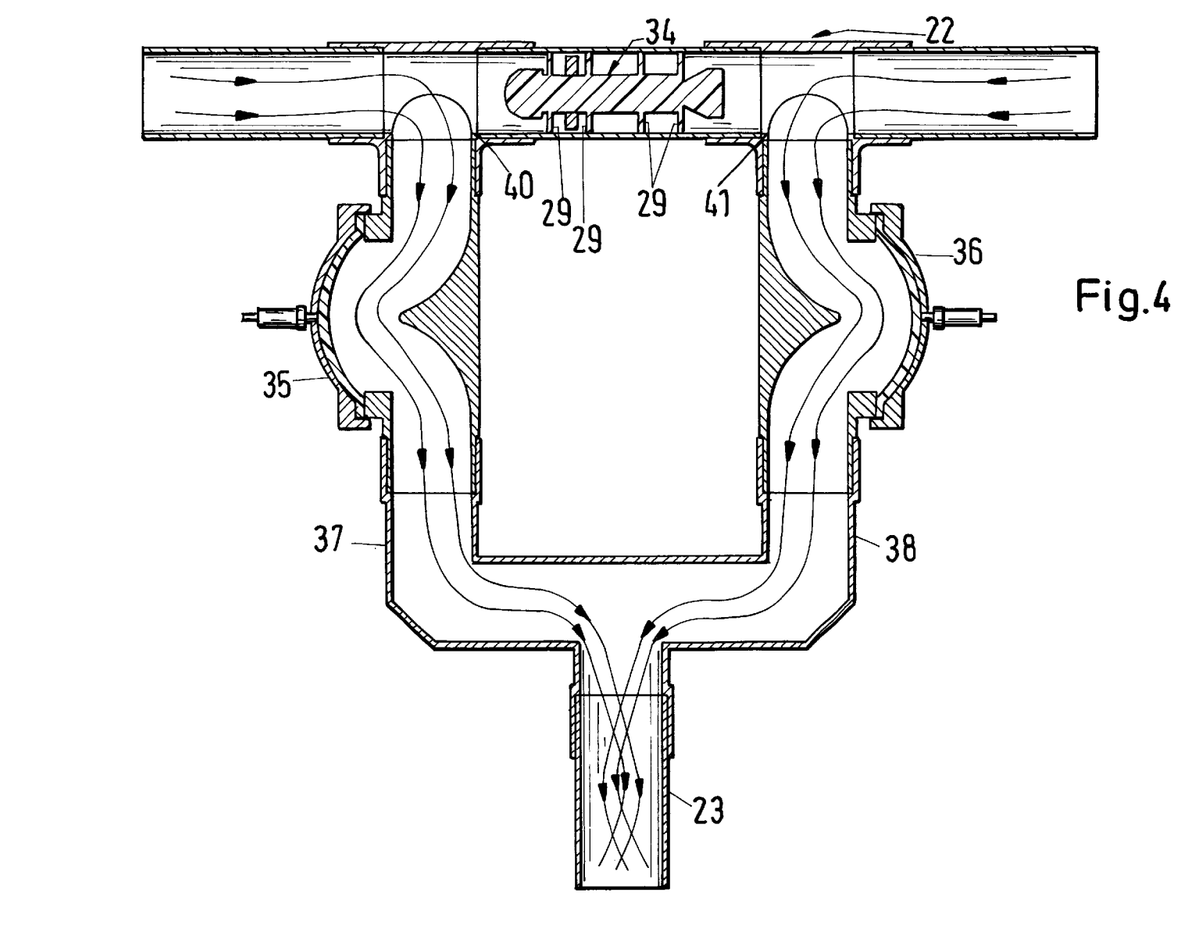
FIG. 4 shows a representation similar to that of FIGS. 2 and 3 to illustrate a branch to a consumer, comprising two partial branches.

FIG. 4 illustrates a variation with a dividing body 34, which is similar to the dividing body 28, and with a branch 22, which comprises two partial outlet pipes 37, 38, which discharge from the service line 20 next to one another and at a distance from one another, independently under the control of a valve 35, 36 into a common outlet pipe 23. The distance between the discharge openings 40, 41 of the partial outlet pipes 37, 38 is larger than the part of the dividing body 34, which brings about the separation, and is formed here by four sealing washers 29. For the simultaneous output of partial amounts of cattle feed to one such branch 22, the dividing body 34 is brought into the position shown between the partial outlet pipes 37, 38, so that feed from both parts of the service line 20 can flow past the dividing body 34 on both sides.

For controlling the feeding device and its parts, a central computer 40 is provided, the program of which determines the sequence of feeding processes from the start to the end.

Figure 5:
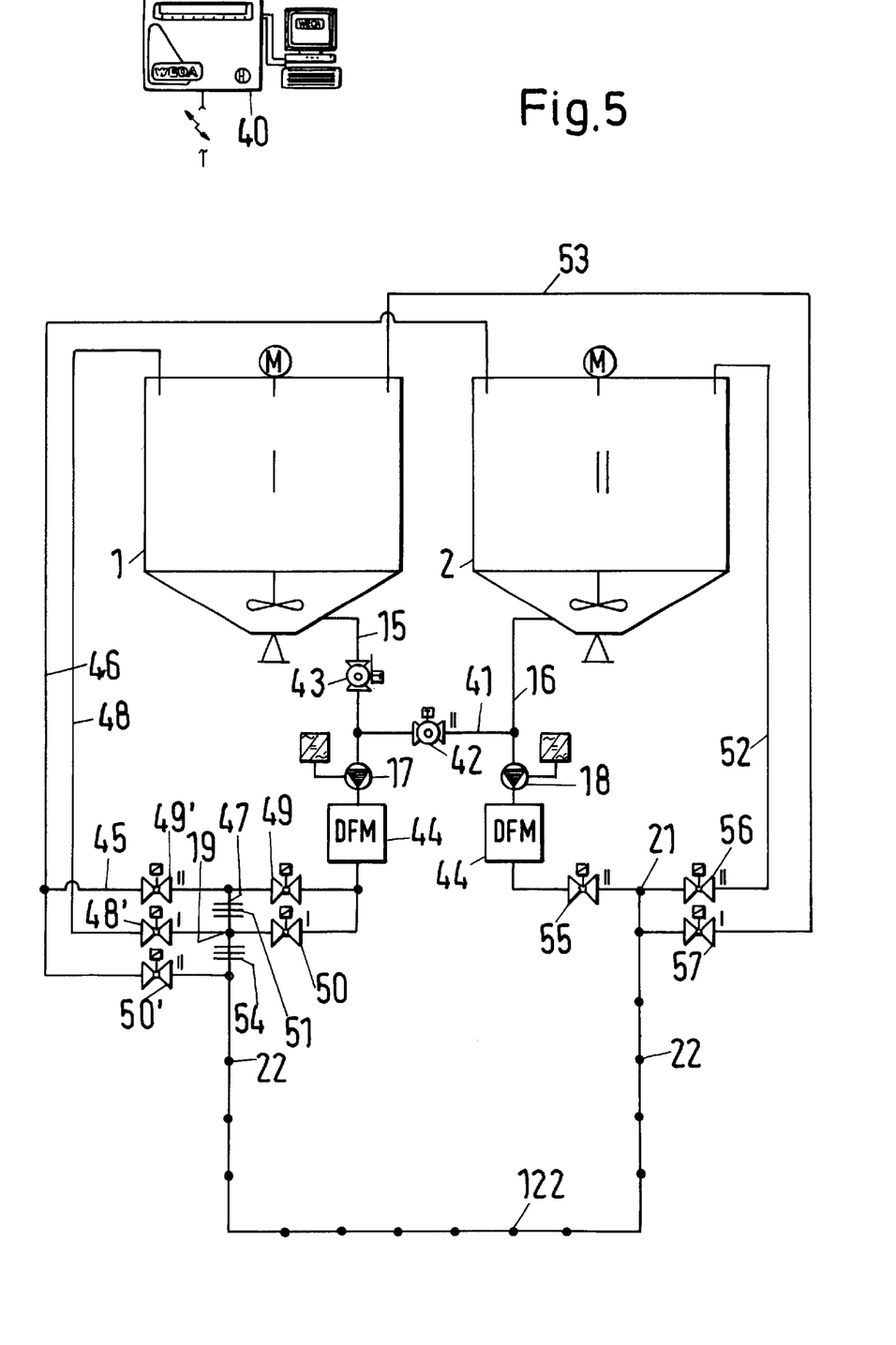
FIG. 5 shows a simplified circuit diagram of a feeding device of modified construction.

FIG. 5 shows a diagrammatic representation of a feeding device, for which parts, identical with those of the device of FIG. 1, are provided with the same reference symbols. As for the device of FIG. 1, the weighing and mixing containers 1, 2 can be charged from storage containers 4 to 7 with feed components, and a computer, corresponding to computer 40, serves to control the course of the operation. To this extent, the device of FIG. 5 is a section of the device of FIG. 1 with the following modifications.

The flow pipes 15, 16 are connected through an intermediate connecting line 41 in the region ahead of the feed pumps 17, 18. In the intermediate connecting line, there is a valve 42 for alternately opening up or closing the line. There is a further valve 43 in the supplying pipeline 15 in the region between the weighing and mixing container 1 and the mouth of the intermediate connecting line 41.

From the flow pipe 15, downstream from the mouth of the intermediate connecting line 41 and downstream from the feed pump 17 and a flow meter 44, disposed after the feed pump 17, a connecting pipeline 45 discharges, which flows into a return pipeline 46 which, in turn, discharges from the service line 20 near the end point 19 of the latter and is taken to the weighing and mixing container 2. A pipeline part 47, which is connected to the end 19 of the service line 20, discharges from the connecting line 45. Furthermore, a return line 48, in which there is a valve 48', is connected to the end 19 of the service line 20 and leads back to the weighing and mixing container 1.

In the connecting line 45, on either side of the discharge of the pipeline part 47, valves 49, 49' for alternately opening up and closing off this pipeline are provided. Furthermore, there are corresponding valves 50, 50' in the flow pipe 15 in the region between the end point 19 of the service line 20 and the discharge of the connecting line 45, as well as close to the end point 19 in the return line 48.

The pipeline part 47 has only a short length and serves to accommodate a second dividing body 51 which, when disposed in the pipeline part 47, occupies its inoperative position.

At the end 21 of the service line 20, a return line 52 is disposed, which leads back to the weighing and mixing container 2. Close to the end point 21, a further return line 53, which is led back to the weighing and mixing container 1, discharges from the service line 20. A valve 55 is provided in the supply pipe 16, near the end point 21 of the service line 20. Valves 56, 57 are also disposed in the pipelines 52, 53 near the end point 21.

Because of this development, the dividing body 54, which is in the service line and can be constructed like the dividing body 24, 27, 28 or 34, can fulfill any delivery function for the feed, as described above in connection with FIG. 1 to 4. Moreover, the construction of the device as in FIG. 5 opens up the possibility that one of the two feed mixtures can be used up completely and that there is only a single feed mixture in the service line 20. This is desirable especially if a feed mixture, for example, the feed mixture prepared in the weighing and mixing container 1, is particularly sensitive and spoils easily and quickly and therefore should not remain in the pipeline system between two feeding processes.

If, for example, the feed mixture in the weighing and mixing container 1 is a sensitive feed mixture, for example, because of the high protein concentration and if, in the course of a feeding process, the delivery of the feed mixtures, prepared in the weighing and mixing containers 1, 2, to the branches 22 intended in each case for this purpose, is essentially concluded, then there still is a previously calculated residual amount of feed in the weighing and mixing containers 2. This residual amount of feed is sufficient in order to fill those parts of the pipeline system, which are still filled at this time with feed from the weighing and mixing container 1 while, at the same time, the weighing and mixing container 1 is empty. By positioning the dividing body 54, for example, at the branch 122, the valve 43 is closed and the valve 42 is opened with the result that both feed pumps 17, 18 can convey feed from the weighing and mixing container 2. If the valve 55 in the supply pipe 16 is closed, while the valves 56, 57 in the return line 52, 53 remain closed, then by opening the valve 49 and closing the valve 50 while the valves 48', 50' in the return lines 46, 48 are closed and the valve 49 in the pipeline part 47 is closed, the pipeline part 47 is acted upon with feed from the weighing and mixing container 2 and the feed still present in the service line 20 and originating from the weighing and mixing container 1 can be distributed at one or more of the branches 22 and, finally, for example, distributed at the branch 122, the dividing body 51 moving as far as the dividing body 54.

After that, the two dividing bodies 51, 54 can be moved back into their inoperative or starting position illustrated in FIG. 5. For this purpose, the valves 49' and 55 are opened and the valves 49, 50 are closed. The feed, located between the dividing body 51 and the end point 19 of the service line 20, is returned by the action of the feed pump 18 into the weighing and mixing container 2, the dividing bodies 51, 54 moving back into the positions shown. At the conclusion of this process, the sensitive feed from the weighing and mixing container 1 is used up completely and the more stable feed mixture from the weighing and mixing container 2 fills the pipeline system completely, aside from the section of flow pipe 15, which is located between the bottom outlet of the weighing and mixing container 1 and the valve 43 and which can be disregarded.

Figure 6:
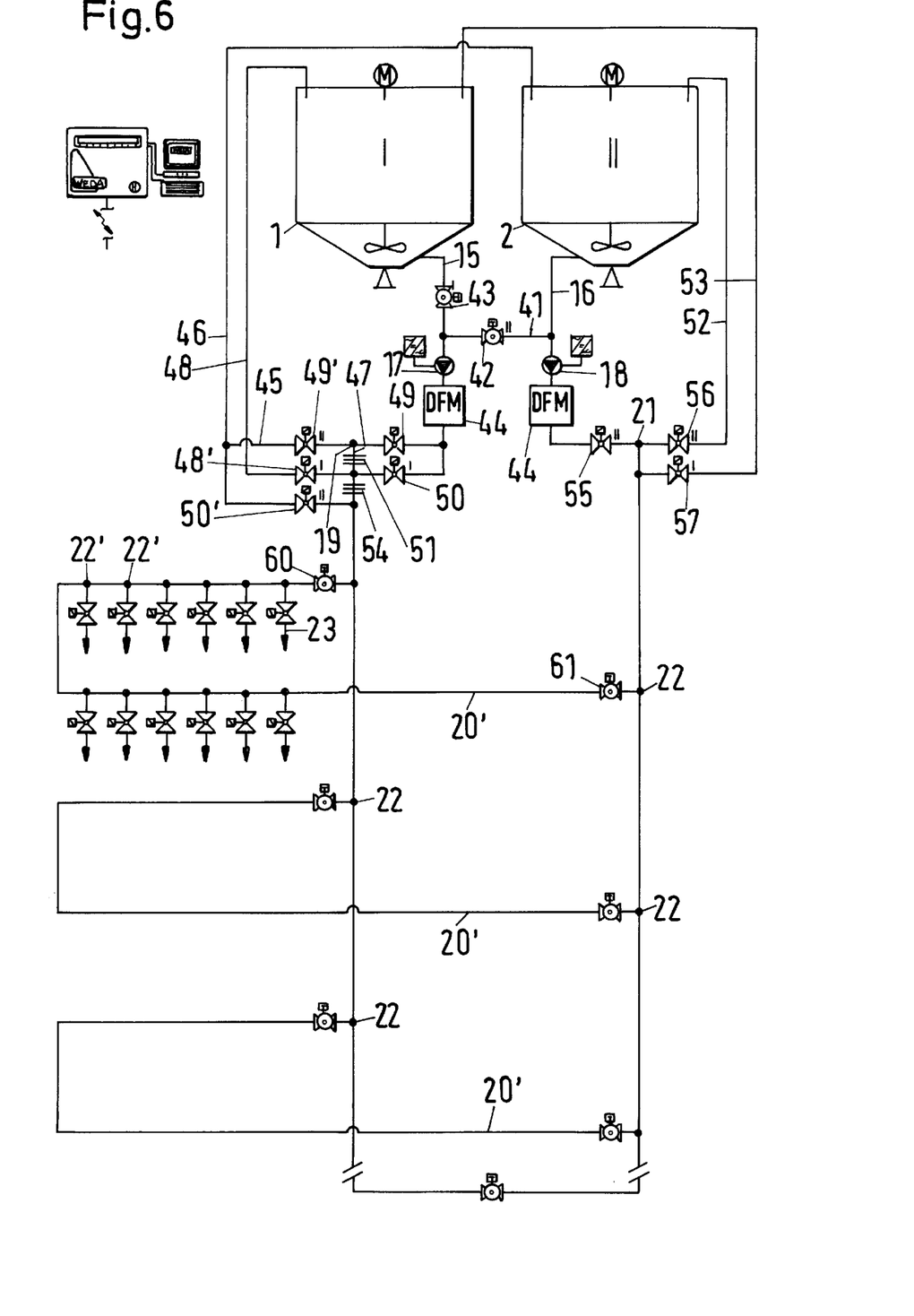
FIG. 6 shows a representation of the feeding device of FIG. 5 with further service lines connected to the branches of the service line.

FIG. 6 illustrates a device of FIG. 5, with the difference that the branches 22 of the service line 20 are connected to pipelines 20' which, in turn, form service lines and in each case can be opened up or closed off by valves 60, 61 disposed close to the branches 22 of the service line 20 and have branches 22' corresponding to those in FIGS. 1 to 5. If the dividing body 54 is disposed appropriately, the service lines 20' can alternately receive feed from one of the two weighing and mixing containers 1, 2 or simultaneously from both, the mixing ratio being determined by the feed pumps 17, 18.

What I claim is:

1. A feeding device, comprising:
    storage containers for stocking feed components;
    two weighing and mixing containers which can be charged from the storage containers with the feed components for the preparation of two cattle feed mixtures of different composition, the weighing and mixing containers each including a bottom outlet;
    a flow pipe connected to the bottom outlet of each of the weighing and mixing containers, each said flow pipe including a feed conveying pump;
    a service line including a first end and a second end, said service line further including valve-controlled branches leading to consumer sites, said branches being located between said first and second ends, each said flow pipe being communicative with a respective one of said first and second ends of the service line;
    dividing means for effecting a separation of the two cattle feed mixtures entering said service line respectively from said first and second ends thereof, said dividing means consisting of a single dividing body located within said service line and movably guidable therein to a desired location within the service line relative the valve-controlled branches, whereby a particular composition of feed at various ones of said valve-controlled branches can be regulated by selection of said desired location; and
    a central control computer for controlling a course of operation.

2. The feeding device according to claim 1, wherein the feed conveying pumps are metering pumps disposed in the flow pipes.

3. The feeding device according to claim 1, wherein the single dividing body, when in one delivery position above a branch opening of a particular one of the branches, opens up a feed passage to the branch opening from two adjoining parts of the service line.

4. The feeding device according to claim 3, wherein the single dividing body is a generally spherical body.

5. The feeding device according to claim 3, wherein the single dividing body includes a part which brings about the separation, the part having an axial dimension which is smaller than corresponding dimensions of the branch opening, such that a feed passage is presented to both sides of the branch opening.

6. The feeding device according to claim 1, further comprising outlet pipes which lead to the consumer sites, the outlet pipes being connected at the branches of the service line.

7. The feeding device according to claim 1, further comprising at least one pipeline connecting one of said valve-controlled branches with another of said valve-controlled branches thereby forming at least one additional service line, the at least one additional service line including additional branches to additional consumer sites.

8. A feeding device, comprising:
    storage containers for stocking feed components;
    two weighing and mixing containers which can be charged from the storage containers with the feed components for the preparation of two cattle feed mixtures of different composition, the weighing and mixing containers each including a bottom outlet;
    a flow pipe connected to the bottom outlet of each of the weighing and mixing containers, each said flow pipe including a feed conveying pump;
    a service line connected to the flow pipes, the service line including valve-controlled branches leading to consumer sites, the service line being connected only at each end thereof with a corresponding one of the flow pipes, at least one of the branches comprising two partial outlet pipes which discharge adjacently via discharging openings at a distance from one another from the service line into a common outlet pipe, the two partial outlet pipes being controlled independently of one another by valves;
    a single dividing body for a separation of feed movably guided within said service line; and
    a central control computer for controlling a course of operation.

9. The feeding device according to claim 8, wherein the distance between the discharging openings of the partial outlet pipes is larger than at least part of the dividing body which brings about the separation.

10. A feeding device, comprising:
    storage containers for stocking feed components;
    two weighing and mixing containers which can be charged from the storage containers with the feed components for the preparation of two cattle feed mixtures of different composition, the weighing and mixing containers each including a bottom outlet;
    a flow pipe connected to the bottom outlet of each of the weighing and mixing containers, each said flow pipe including a feed conveying pump;
    a service line including a first end and a second end, said service line further including valve-controlled branches leading to consumer sites, said branches being located between said first and second ends, each said flow pipe being communicative with a respective one of said first and second ends of the service line;
    dividing means for effecting a separation of the two cattle feed mixtures entering said service line respectively from said first and second ends thereof, said dividing means consisting of a single dividing body located within said service line and movably guidable therein to a desired location within the service line relative the valve-controlled branches, whereby a particular composition of feed at various ones of said valve-controlled branches can be regulated by selection of said desired location;
    a pipeline part adjacent to one of said first and second ends, and which is connected to said service line;
    a connecting pipeline connecting one of the flow pipes with said pipeline part; and
    a second dividing body which can be transferred from an inoperative position, in which it is disposed within said pipeline part, into an operative position in which said second dividing body enters the service line and, on a side thereof, averted from the single dividing body, and which can be acted upon with feed from one of the two weighing and mixing containers from the connecting pipeline and can be shifted by the action of said feed in a direction of the single dividing body.

11. The feeding device according to claim 10, further comprising:

a valve-controlled intermediate connecting pipeline for selectively connecting the flow pipes from the weighing and mixing containers to the conveying feed pumps with one another; and a shutoff valve provided in one of the flow pipes upstream from a mouth of the intermediate connecting pipeline, the connecting pipeline being connected to said one of the flow pipes downstream from the mouth of the intermediate connecting pipeline.

12. The feeding device according to claim 10, further comprising a flow meter disposed behind each of the feed conveying pumps.

13. The feeding device mechanism according to claim 10, further comprising:

a valve-controlled intermediate connecting pipeline for selectively connecting the flow pipes from the weighing and mixing containers to the conveying feed pumps with one another; and a shutoff valve provided in one of the flow pipes upstream from a mouth of the intermediate connecting pipeline, the connecting pipeline being connected to said one of the flow pipes downstream from the mouth of the intermediate connecting pipeline.

14. In a feeding device in which two weighing and mixing containers are charged with feed components from storage containers for the preparation of two feed mixtures of different composition, the weighing and mixing containers each including a bottom outlet to which a corresponding flow pipe is connected, the flow pipes each including a feed conveying pump for supply of the feed mixtures to a service line including a first end and a second end, the service line further comprising valve-controlled branches leading to consumer sites, a mechanism for regulating delivery of each of the two feed mixtures at each of the branches comprising:

dividing means for effecting a separation of the two cattle feed mixtures entering said service line respectively from said first and second ends thereof, said dividing means consisting of a single dividing body disposed for guided movement within the service line; and said first and second ends of the service line being communicative with a respective one of the flow pipes, the single dividing body providing the separation of one of the two feed mixtures from a remaining one of the two feed mixtures present in the service line such that the two feed mixtures from the two weighing and mixing containers act upon the single dividing body from opposed sides within the service line, thereby permitting controlled movement of the single dividing body to a desired position within the service line.

15. The feeding device mechanism according to claim 14, further comprising a central control computer for controlling a course of operation.

16. The feeding device mechanism according to claim 14, wherein the single dividing body is a generally spherical body.

17. The feeding device mechanism according to claim 14, wherein the single dividing body opens up a feed passage to a branch opening of a particular one of the branches leading from two adjoining parts of the service line when in a delivery position in which the single dividing body is located above said branch opening.

18. The feeding device mechanism according to claim 17, wherein at least a structural portion of the single dividing body achieves the separation of the two feed mixtures in the service line, an axial dimension of the structural portion being smaller than corresponding dimensions of said branch opening, such that a feed passage is presented to the supply line on both sides of said branch opening.

19. In a feeding device in which two weighing and mixing containers are charged with feed components from storage containers for the preparation of two feed mixtures of different composition, the weighing and mixing containers each including a bottom outlet to which a corresponding flow pipe is connected, the flow pipes each including a feed conveying pump for supply of the feed mixtures to a service line including valve-controlled branches leading to consumer sites, a mechanism for regulating delivery of each of the two feed mixtures at each of the branches comprising:

a single dividing body disposed for guided movement within the service line; and the service line being connected at each end thereof with a corresponding one of the flow pipes, the single dividing body providing a separation of one of the two feed mixtures from a remaining one of the two feed mixtures present in the service line such that the two feed mixtures from the two weighing and mixing containers act upon the single dividing body from opposed sides within the service line, thereby permitting controlled movement of the single dividing body to a desired position within the service line, at least one of the branches comprising two partial outlet pipes which discharge adjacently via discharging openings at a distance from one another from the service line into a common outlet pipe, the two partial outlet pipes being controlled independently of one another by valves, and the distance between the discharging openings of the partial outlet pipes being larger than at least a portion of the dividing body achieving the separation of the two feed mixtures.

20. In a feeding device in which two weighing and mixing containers are charged with feed components from storage containers for the preparation of two feed mixtures of different composition, the weighing and mixing containers each including a bottom outlet to which a corresponding flow pipe is connected, the flow pipes each including a feed conveying pump for supply of the feed mixtures to a service line including a first end and a second end, the service line further comprising valve-controlled branches leading to consumer sites, a mechanism for regulating delivery of each of the two feed mixtures at each of the branches comprising:

dividing means for effecting a separation of the two cattle feed mixtures entering said service line respectively from said first and second ends thereof, said dividing means consisting of a single dividing body disposed for guided movement within the service line;

said first and second ends of the service line being communicative with a respective one of the flow pipes, the single dividing body providing the separation of one of the two feed mixtures from a remaining one of the two feed mixtures present in the service line such that the two feed mixtures from the two weighing and mixing containers act upon the single dividing body from opposed sides within the service line, thereby permitting controlled movement of the single dividing body to a desired position within the service line;

a pipeline part adjacent to one of said first and second ends, and which is connected to said service line;

a connecting pipeline connecting one of the flow pipes with said pipeline part; and a second dividing body which can be transferred from an inoperative position in which it is disposed within said pipeline part, into operative positions in the service line averted from the single dividing body, and in which the second dividing body can be acted upon by a corresponding one of the feed mixtures feed from one of the two weighing and mixing containers via the connecting pipeline and can be shifted by the action of said corresponding one of the feed mixtures in a direction of the single dividing body.

21. A feeding device, comprising:

storage containers for stocking feed components;

two weighing and mixing containers which can be charged from the storage containers with the feed components for the preparation of two cattle feed mixtures of different composition, the weighing and mixing containers each including a bottom outlet;

a flow pipe connected to the bottom outlet of each of the weighing and mixing containers, each said flow pipe including a feed conveying pump;

a service line connected to the flow pipes, the service line including valve-controlled branches leading to consumer sites, the service line being connected only at each end thereof with a corresponding one of the flow pipes;

a dividing body for a separation of feed movably guided within said service line;

at least one pipeline connecting one of said valve-controlled branches with another of said valve-controlled branches thereby forming a parallel circuit comprised of at least one additional service line, the at least one additional service line including additional branches leading to additional consumer sites; and a central control computer for controlling a course of operation.

22. In a feeding device in which two weighing and mixing containers are charged with feed components from storage containers for the preparation of two feed mixtures of different composition, the weighing and mixing containers each including a bottom outlet to which a corresponding flow pipe is connected, the flow pipes each including a feed conveying pump for supply of the feed mixtures to a service line, the service line further comprising valve-controlled branches leading to consumer sites, a mechanism for regulating delivery of each of the two feed mixtures at each of the branches comprising:

a dividing body disposed for guided movement within the service line;

at least one pipeline connecting one of said valve-controlled branches with another of said valve-controlled branches thereby forming a parallel circuit comprised of at least one additional service line, the at least one additional service line including additional branches leading to additional consumer sites; and the service line being connected at respective ends thereof with a corresponding one of the flow pipes, the dividing body providing a separation of one of the two feed mixtures from a remaining one of the two feed mixtures present in the service line such that the two feed mixtures from the two weighing and mixing containers act upon the dividing body from opposed sides within the service line, thereby permitting controlled movement of the single dividing body to a desired position within the service line.

23. In a feeding device in which two feed mixtures of different composition are fed from separate feed mixture supplies via respective conduits to a service line including a first end and a second end, the service line further comprising branches leading to consumer sites, a mechanism for regulating delivery of each of the two feed mixtures at each of the branches comprising:

dividing means for effecting a separation of the two cattle feed mixtures entering said service line respectively from said first and second ends thereof, said dividing means consisting of a single dividing body disposed for guided movement within the service line; and said first and second ends of the service line being communicative with a respective one of the conduits, the single dividing body providing the separation of one of the two feed mixtures from a remaining one of the two feed mixtures present in the service line such that the two feed mixtures fed from the separate supplies act upon the single dividing body from opposed sides within the service line, thereby permitting controlled movement of the single dividing body to a desired position within the service line.

* * * * *